US008863062B2

(12) United States Patent  (10) Patent No.: US 8,863,062 B2
Chuang et al.  (45) Date of Patent: Oct. 14, 2014

(54) METHODS AND APPARATUS FOR FLOORPLANNING AND ROUTING CO-DESIGN

(75) Inventors: Yi-Lin Chuang, Taipei (TW); Ji-Jan Chen, Kaohsiung (TW); Ching-Fang Chen, Taichung (TW); Yun-Han Lee, Baoshan Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 50 days.

(21) Appl. No.: 13/544,009

(22) Filed: Jul. 9, 2012

(65) Prior Publication Data

US 2013/0290914 A1  Oct. 31, 2013

Related U.S. Application Data

(60) Provisional application No. 61/640,554, filed on Apr. 30, 2012.

(51) Int. Cl.
 *G06F 17/50* (2006.01)
(52) U.S. Cl.
 USPC ........................................................ 716/118
(58) Field of Classification Search
 USPC ........................................................ 716/118
 See application file for complete search history.

(56) References Cited

U.S. PATENT DOCUMENTS 8,261,226 B1 * 9/2012 Becker et al. ................. 716/126
8,473,881 B1 * 6/2013 Fang et al. .................... 716/105

OTHER PUBLICATIONS

Chen, T., et al., "MP-trees: A Packing-Based Macro Placement Algorithm for Mixed-Size Designs," Design Automation Conference, 44th ACM/IEEE, Jun. 4-8, 2007, pp. 447-452.

Huang, H., et al., "Congestion-Driven Floorplanning by Adaptive Modular Shaping," Circuits and Systems, 2005. 48th Midwest Symposium on . . . , vol. 2, Aug. 7-10, 2005, pp. 1067-1070. doi: 10.1109/MWSCAS.2005.1594289.

Chen, T., et al., "MP-Trees: A Packing-Based Macro Placement Algorithm for Modern Mixed-Size Designs," IEEE Transactions on Computer-Aided Design of Integrated Circuits and Systems, vol. 27, No. 9, Sep. 2008, pp. 1621-1634. doi: 10.1109/TCAD.2008.927760.

(Continued)

*Primary Examiner* — Vuthe Siek
*Assistant Examiner* — Aric Lin
(74) *Attorney, Agent, or Firm* — Slater & Matsil, L.L.P.

(57) ABSTRACT

Methods and apparatus of performing floorplanning and routing for function blocks within a die and among multiple die are disclosed. Multiple die together with function blocks within each die may be represented by a flexible hierarchical (FH) tree. An initial floorplan for multiple die may be generated and hot spots between die or among function blocks within a die may be identified. Spacer blocks may be inserted between die, and block inflation may be performed, to remove hot spots. More perturbation of the block positions can be performed on the FH tree to rearrange the blocks and die. After the multiple die floorplanning, a plurality of micro bumps may be mapped to a plurality of pins of blocks of the plurality of die, placement and routing may be performed for the plurality of blocks within each die and connections for the plurality of dies.

20 Claims, 11 Drawing Sheets

(56) References Cited

OTHER PUBLICATIONS

Lou, J., et al., "Estimating Routing Congestion Using Probalistic Analysis," IEEE Transactions on Computer-Aided Design of Integrates Circuits and Systems, vol. 21, No. 1, Jan. 2002, pp. 32-41. doi: 10.1109/43.974135.

Huang, H., et al., "Congestion-Driven Floorplanning by Adaptive Modular Shaping," 48th Midwest Symposium on Circuits and Systems, vol. 2, Aug. 7-10, 2005, pp. 1067-1070. doi: 10.1109/MWSCAS.2005.1594289.

\* cited by examiner

METHODS AND APPARATUS FOR FLOORPLANNING AND ROUTING CO-DESIGN

This application claims the benefit of U.S. Provisional Application No. 61/640,554, filed on Apr. 30, 2012, entitled Methods and Apparatus for Floorplanning and Routing Co-Design, which application is hereby incorporated herein by reference.

BACKGROUND

Due to the continual reductions in minimum feature size of electronic components such as transistors and capacitors and the continual increasing of application complexities, semiconductor Integrated Circuits (ICs) are increasingly more complex with millions of electronic components connected together to perform intended functions. These smaller electronic components also require smaller packages that utilize less area than packages of the past. One type of smaller package that has been developed is three-dimensional (3D) ICs, in which two die or multiple die or ICs are bonded together and electrically connected between the die and contacts on an interposer.

Modern IC design, fabrication, and packaging rely heavily on the use of various software tools, called computer aided design (CAD) tools or electronic design automation (EDA) tools, which perform the tasks required to implement desired circuit functions onto silicon. An IC design may start with a software description, e.g., in a programming language such as C or VHDL, of the functionality of the circuit, which is then synthesized to generate a logic "netlist" containing a description of the interconnected gate-level hardware elements.

The physical design process follows the synthesis step, where the hardware elements and their connections are physically laid out, represented as placements of geometric shapes, often referred to as a layout, on a variety of layers to be fabricated on the semiconductor device. Physical design operations may comprise: design netlist (after synthesis), floorplanning, placement, routing, physical verification, generation of layout data, which will be used for fabrication. After the die have been fabricated, multiple die may be packaged together using 3D IC technology or other packaging technologies. Throughout this description, the word die may be used to refer to a singular die or plural dies.

The traditional serialized design flow of digital systems, e.g., logic synthesis followed by floorplanning, placement, and routing, introduces potential optimization disconnects. Optimization decisions made at one stage may not correlate well with the solution quality at a next stage. The current CAD tools are further limited to the design flow within a die, instead of dealing with multiple die in a package. Therefore there is a need to combine the floorplanning with placement and routing, and to deal with multiple die in a package level as well.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the embodiments of the present disclosure are discussed in detail below. It should be appreciated, however, that the embodiments of the present disclosure provide many applicable concepts that can be embodied in a wide variety of specific contexts. The specific embodiments discussed are merely illustrative of specific ways to make and use the disclosure, and do not limit the scope of the disclosure.

As will be illustrated in the following, methods and apparatus of performing floorplanning and routing for function blocks within a die and among multiple die are disclosed, which take into consideration effects in the physical design phase as well as the packaging phase of Integrated Circuit (IC) design and production. Multiple die together with function blocks within each die may be represented by a flexible hierarchical (FH) tree. An initial floorplan for multiple die may be generated and hot spots between die or hot spots among function blocks within a die for routing congestion may be identified. Then spacer blocks may be inserted between die to remove hot spots between die, and block inflation may be performed to remove hot spots among function blocks within a die. The spacer block insertion and the block inflation may change the number of blocks or the shape of the blocks. More perturbation of the block positions can be performed using the FH tree representation to rearrange the blocks to make the floorplanning to meet further performance metrics.

Figure 1A:
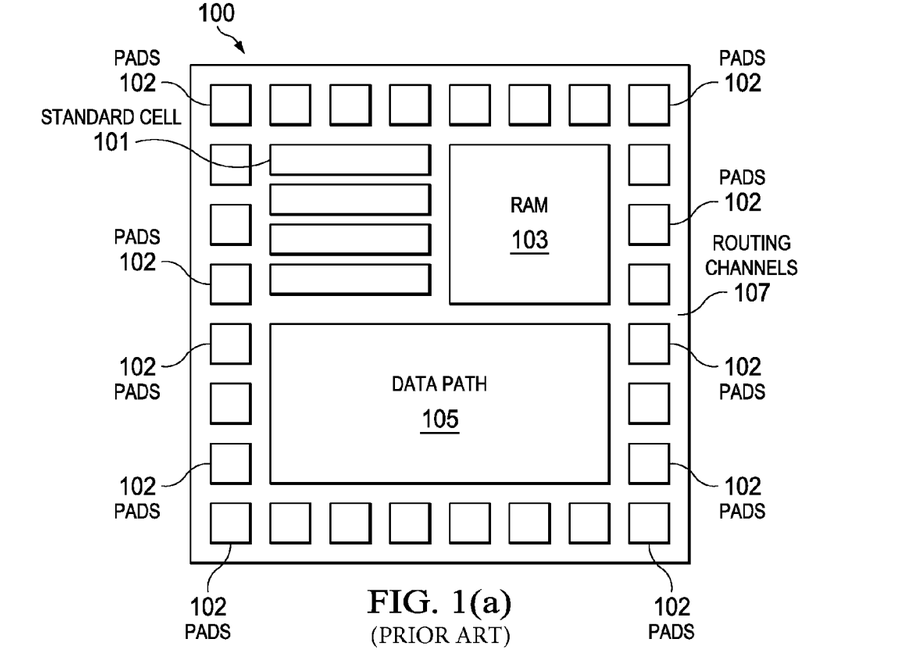
FIGS. 1(a)-1(b) illustrate an exemplary floorplan for a die.

FIG. 1(a) illustrates various function blocks within a die 100. A die may be referred as an integrated circuit (IC), or a circuit. There are several function blocks such as a plurality of standard cells 101, a random access memory (RAM) block 103, and a data path block 105 located on the die. A function block may be referred as a block as well. Many contact pads 102 may be located at the peripheral of the die 100. The function blocks shown in FIG. 1(a) are only for illustration purposes and there may be other kinds of function blocks and other number of function blocks within a die.

As illustrated in FIG. 1(a), several routing channels or routing tracks 107 are for routing the metal lines to connect the function blocks 101, 103, and 105. After the blocks have been placed, a router constructs the metal lines on the die that connect the function blocks together. The routing is based on position of I/O pins of each function block.

In an IC design process, the function blocks may be generated by the logic synthesis tools and partition tools which generate a logic "netlist" containing a description of the interconnected gate-level hardware elements, and further partitioned to form function blocks such as the blocks 101, 103, and 105 in FIG. 1(*a*). Afterwards, a floorplanning tool, or a floorplanner, is used to generate the floorplan for the circuit. Floorplanning is the process of identifying structures that should be placed close together, and allocating space for them in such a manner as to meet the sometimes conflicting goals of available space and required performance. A floor planning may be performed in part by techniques such as simulated annealing or other techniques such as mathematical programming.

Figure 1B:
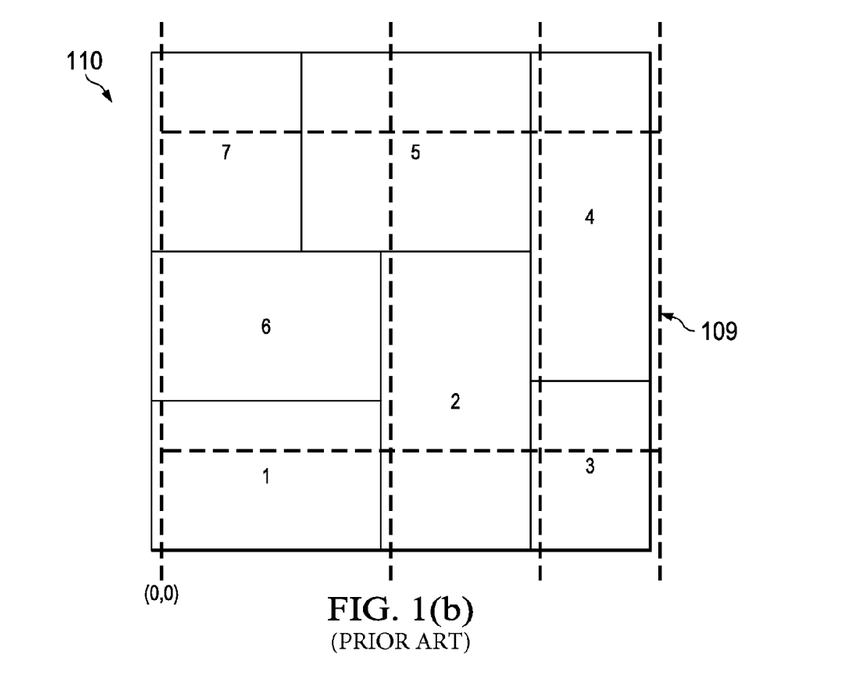

FIG. 1(*b*) illustrates a floorplan of function blocks of an IC generated by a floorplanner, where a plurality of function blocks is placed in a given layout area 110 within a die. Each function block 1 to 7 is a rectangle. Each function block 1 to 7 may be a block shown in FIG. 1(*a*). In some embodiment, the floorplan may comprise some area not occupied by function blocks. A rectangle block may be identified by its lowest left corner, plus a height and a weight measurement. A rectangle block may be identified by other ways, such as the center of the rectangle in addition to the height and the width.

As illustrated in FIG. 1(*b*), each function block 1 to 7 may be hard macros, soft macros, standard cells, or other format. The blocks may be L and T-shaped as well, not shown. Due to the wide use of intellectual property modules and embedded memories, a die may comprise a significant number of large hard macros. For the sake of simplifying the discussion, these geometric objects are shown as rectangular blocks in this document.

The layout area 110 in FIG. 1(*b*) further comprises a plurality of layout grid 109. In one embodiment, the floorplanner may divide the layout area 110 into rows and columns of buckets, which may be called as tiles or bins. The height and the width of all buckets may be same. An exemplary bucket size is 30×30 wiring tracks. In some other embodiments, the height and the width of the buckets or grid may be flexible and different from each other. There may be a global coordinate centered at the lowest left corner of the layout area 110 with the coordinate (0,0).

The blocks in FIG. 1(*b*) may be connected by various kinds of nets, not shown. A 2-pin net may span a number of buckets. A net can be of different classes of nets, such as short, flat, L-shaped, or Z-shaped. Multi-pin nets may be used to bridge the pins. The connections among the blocks are specified by a netlist.

FIG. 2(*a*) illustrates a cross sectional view of a 3D IC in accordance with an embodiment, where floorplanning for multiple die may be needed. A 3D IC 200 may comprise two die 211 and 213 stacked on an interposer 201. The first die 211 may be a processor while the second die 213 may be a memory. Both die 211 and 213 are attached to a first side or a front side 2011 of the interposer 201 through a plurality of interconnect components such as micro bumps 203. The die 211 and 213 and the micro bumps 203 may be embedded in an encapsulation layer, which is not shown. The interposer 201 may have a substrate 2017 made of silicon, glass and/or the like. The interposer 201 may comprise a plurality of through-silicon-vias (TSV) 2013 embedded in the interposer 201. After the die 211 and 213 are bonded on the interposer 201, the active circuits of the die 211 and 213 are coupled to the TSVs 2013 of the interposer 201 through a conductive channel formed by the interposer routing layer 2019 and micro bumps 203, wherein the interposer routing layer 2019 comprises a plurality of metal lines connecting various dies, and blocks of a die to other blocks of a die.

Figure 2A:
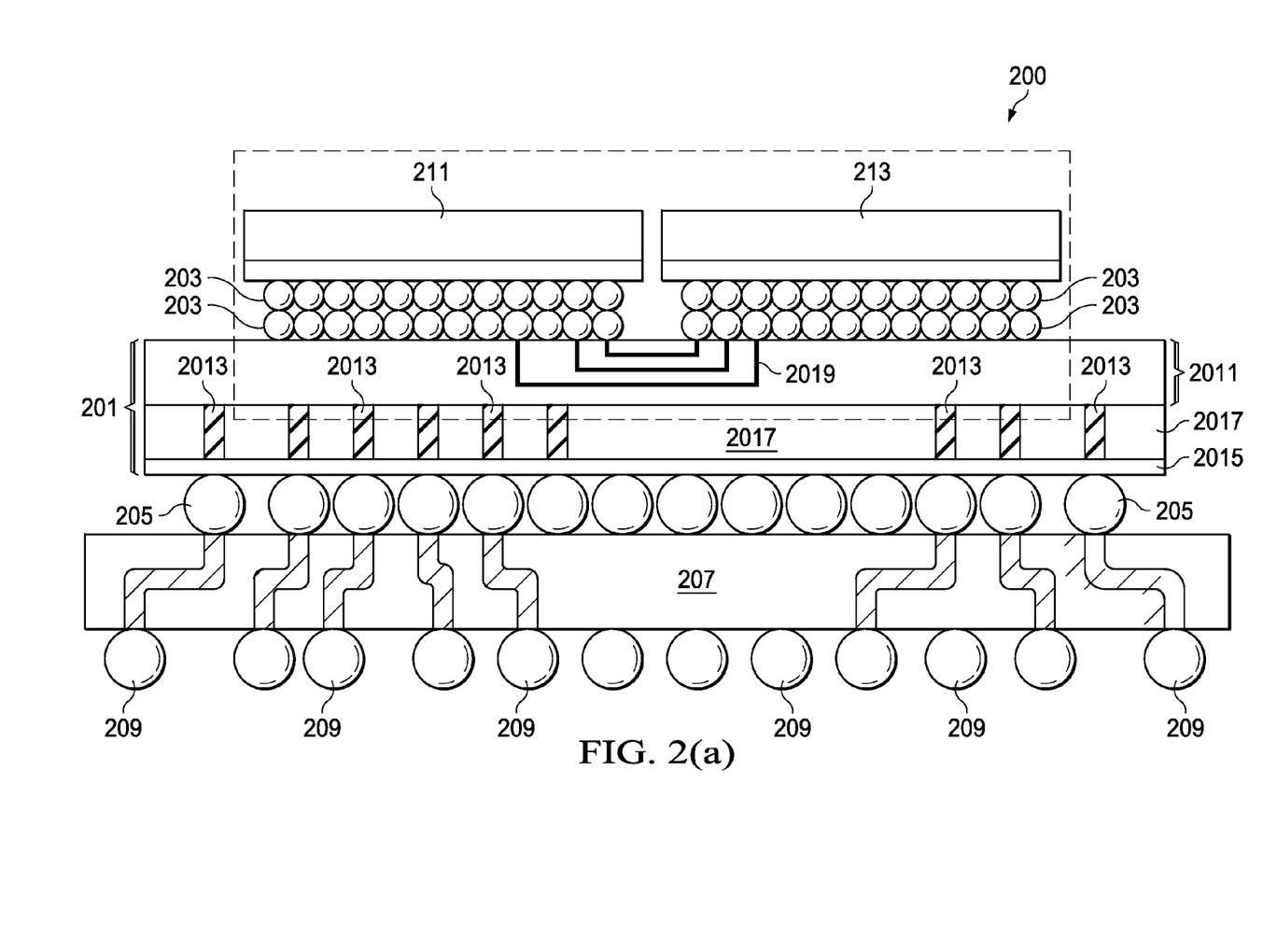
FIGS. 2(a)-2(d) illustrate an exemplary floorplan and routing for two die placed on an interposer.

A second side or the back side 2015 of the interposer 201 may be attached to a package substrate 207 by a plurality of interconnect bumps 205. In accordance with an embodiment, these interconnect bumps 205 may be solder balls. The package substrate 207 may be connected to a printed circuit board or the like through a plurality of ball grid array 209.

More details of the die 211 and 213 in FIG. 2(*a*) may be shown in FIGS. 2(*b*)-2(*c*). As illustrated in FIG. 2(*b*), the die 211 may comprise blocks of SRAM 2111 and SRAM 2117, a controller block 2115, a cache block 2119, and a computation unit block 2113. Each block may have a plurality of I/O pins 2121, which are connected to a plurality of micro bumps 2123. As illustrated in FIG. 2(*c*), the die 213 may comprise a SRAM block 2131, a controller block 2135, a cache block 2133, and a data path block 2117. Each block may have a plurality of I/O pins 2141, which are connected to a plurality of micro bumps 2143. The function blocks shown in FIGS. 2(*b*)-2(*c*) are for illustration purposes only and are not limiting. There may be different number of function blocks within each die, and they may be different functions for each function block.

FIG. 2(*d*) illustrates a floorplan representing two die 211 and 213 connected to an interposer as shown in FIG. 2(*a*), wherein each die comprises a plurality of blocks. The die 211 may comprise a plurality of blocks 2111, 2113, 2115, 2117, and 2119. There is a plurality of areas 291 and 293 which are not occupied by any blocks. Similarly the die 213 may comprise a plurality of blocks 2131, 2133, 2135, 2137, 2139 and 2141. There is a plurality of areas 295 and 297 which are not occupied by any blocks. Each block is a rectangle. The may be a global coordinate system located at the lowest left corner with the coordinate (0,0), which is shared by the two die 211 and 213. A rectangle may be defined by its lowest left corner, plus a height and a weight measurement. Other coordinate system may be defined as well, such as using the coordinates of the center of each block in addition to the height and the width. The blocks may be hard macros, soft macros, standard cells, or other format. The blocks may be of a function such as a SRAM, a controller, a cache, and a computation unit, or a data path block.

Figure 2B:
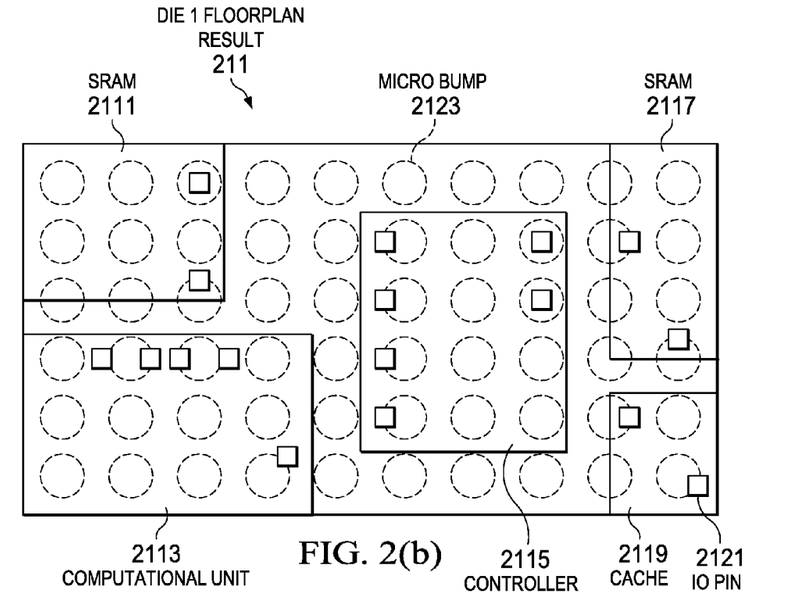
Figure 2C:
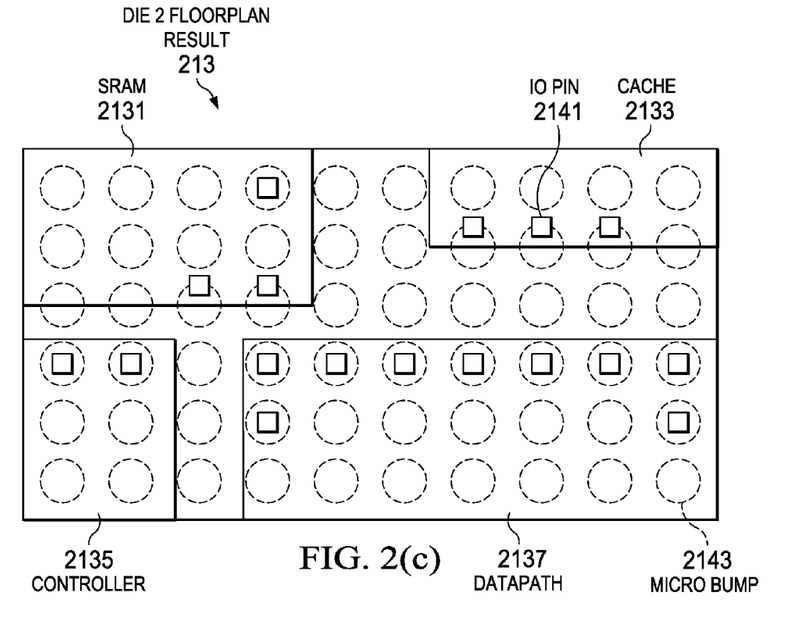
Figure 2D:
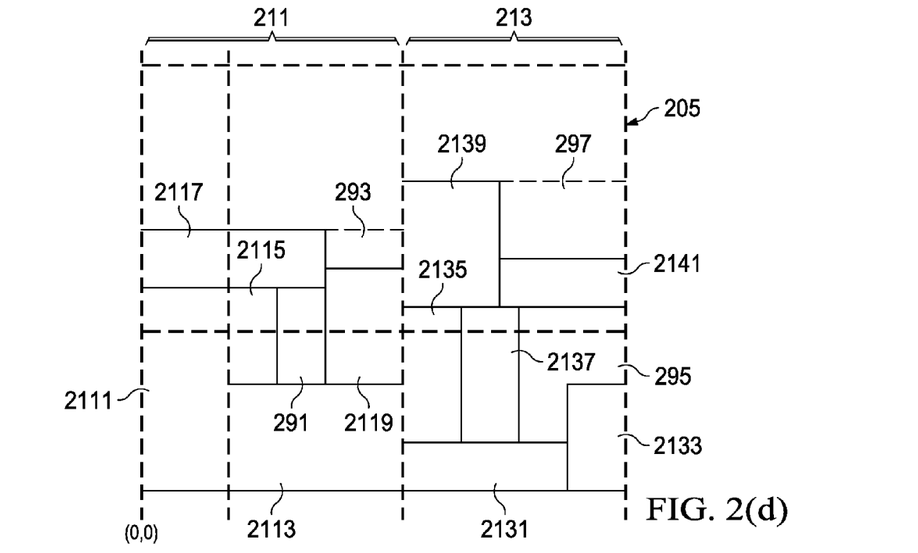
Figure 3A:
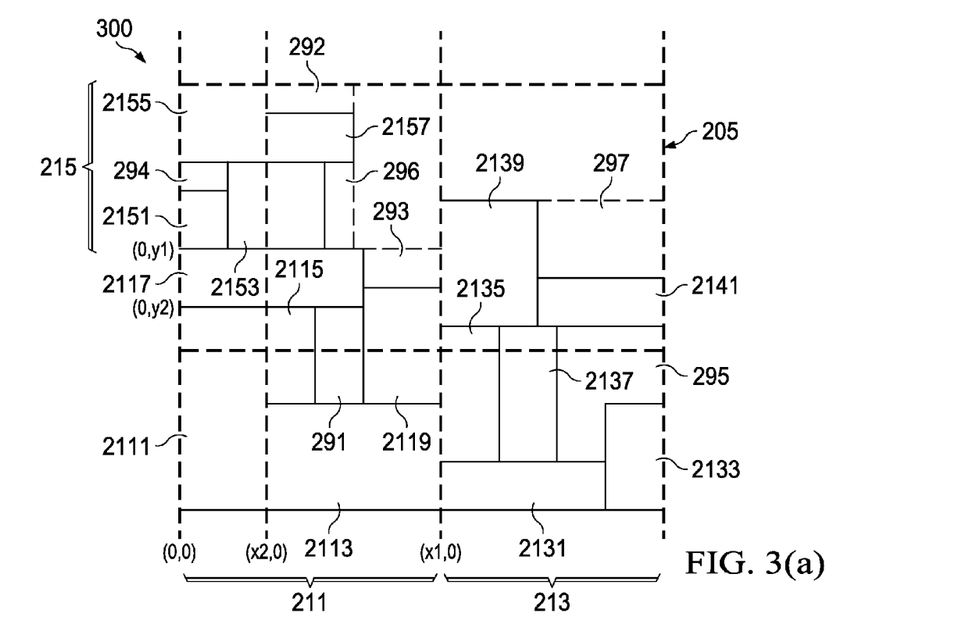
FIGS. 3(a)-3(b) illustrate an exemplary representation of a floorplan for multiple die.

In general, there may be multiple die interconnected on an interposer. FIG. 3(*a*) illustrates a floorplan 300 where three die 213, 213, and 215 are interconnected. Similar to FIG. 2(*d*), the die 211 may comprise a plurality of blocks 2111, 2113, 2115, 2117, and 2119. There is a plurality of areas 291 and 293 which are not occupied by any blocks. Similarly the die 213 may comprise a plurality of blocks 2131, 2133, 2135, 2137, 2139 and 2141. There is a plurality of areas 295 and 297 which are not occupied by any blocks. In addition, the die 215 may comprise a plurality of blocks 2151, 2153, 2155, and 2157, plus three unoccupied space 292, 294, and 296. The three die may share a global coordinate system, where the lowest left corner has a coordinate (0,0). The position of each die may be defined by its own lowest left corner, plus a height and a width. The die 213 has its lowest left corner at (x1,0), and the die 215 has its lowest left corner at (0, y1). The die 211 has its lowest left corner at (0,0), x1 and y1 are the height and width of the die 211. The point (x1, 0) may be the right corner of die 211, while the point (0, y1) may be the upper corner of die 211.

Figure 3B:
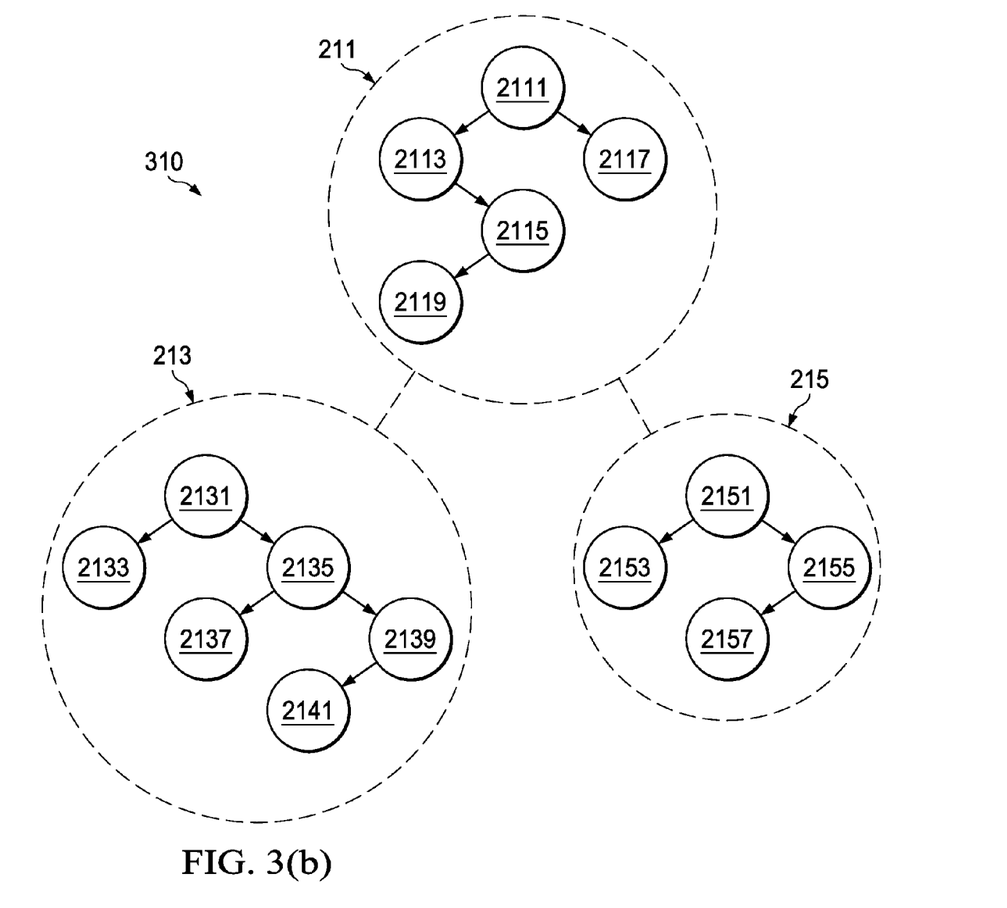

FIG. 3(*b*) illustrates a flexible hierarchical (FH) tree 310 used to represent a floorplan 300 of multiple die, where each die comprises a plurality of function blocks. A FH tree 310 is a binary hierarchical tree for modeling a floorplan of multiple die, which transforms a physical floorplan into a graph representation for easy optimization by a floorplanner tool. The FH tree representation provides information regarding multiple die at the same time so that floorplanning can be optimized simultaneously among multiple die.

Each node in the FH tree 310 corresponds to a die. The FH tree 310 in FIG. 3(b) has a root 211 representing the die 211 shown in FIG. 3(a), a left child 213 representing the die 213 shown in FIG. 3(a), and a right child 215 representing the die 215 shown in FIG. 3(a). Each node of the FH tree 310 is also a tree itself representing various blocks within the die. The root node 211 is itself a tree with 5 nodes, corresponding to the 5 blocks of the die 211, wherein each block is marked by its corresponding node within the tree 211. Similarly, the node 213 is a tree representing all the blocks within the die 213; and the node 215 is a tree representing all the blocks within the die 215.

The root node of the FH tree represents the die located in the lowest left corner of the plurality of die, called the root die, or the left-most die. In a coordinate system, a point A is the lowest left corner among a plurality of points if A has the smallest x coordinate value among all the plurality of points, and further has the smallest y coordinate value. For example, the die 211 has a corner coordinate as (0,0), the die 213 has a corner coordinate as (x1,0), and the die 215 has a corner coordinate as (0, y1). The lowest left corner is the point has the smallest x coordinate and the smallest y coordinate. Therefore the die 211 has the lowest left corner. The four corners of the die 211 have the coordinates as (0, 0), (x1, 0), (0, y1), and (x1, y1). If there are only two die, then the one with the smaller x coordinate and y coordinate is the left-most die.

The left child of the root of a FH tree represents a die, called the left child die, on the right side next to the root die 211, which means the left child die has an x coordinate which is larger than x1, a right corner of the root die 211, and it is the smallest among those points that have an x coordinate larger than x1, and it has a same y coordinate as a y coordinate of the right corner of the root die 211. For example, the die 211 has a corner coordinate as (0,0), the die 213 has a corner coordinate as (x1,0), and the die 215 has a corner coordinate as (0, y1). The four corners of the die 211 have the coordinates as (0, 0), (x1, 0), (0, y1), and (x1, y1). The die 211 is the root die. The die 213 has its left-most corner as (x1, 0), a x coordinate that is larger than x1, the right corner of the root die 211, and it is the smallest among those points that have an x coordinate larger than x1, which is only one block that has a larger than x1 right corner. Therefore the die 213 is the left-child die for the FH tree 310.

The right child of the root of a FH tree represents a die, called the right child die, on the top of the root die 211, which means the right child die has a y coordinate which is larger than y1, and it is the smallest among those points that have a y coordinate larger than y1, and it has a same x coordinate as a x coordinate of the upper corner of the left-most die. For example, the die 211 has a corner coordinate as (0,0), the die 213 has a corner coordinate as (x1,0), and the die 215 has a corner coordinate as (0, y1). The four corners of the die 211 have the coordinates as (0, 0), (x1, 0), (0, y1), and (x1, y1). The die 211 is the root die. The die 215 has its left-most corner as (0, y1), a y coordinate that is larger than y1, the upper corner of the root die 211, and it is the smallest among those points that have an y coordinate larger than y1, which is only one block that has a larger than x1 left-most corner. Therefore the die 215 is the right-child die for the FH tree 310.

Each node A of the FH tree represents a tree itself, constructed with nodes represent the blocks within the die represented by the node A. The tree represented by a node is constructed in the same way as for the FH tree. For the node representing the die 211, the tree within the node is constructed by nodes representing all blocks within the die 211, which are blocks 2111, 2113, 2115, 2117, and 2119. The block 2111, defined by the four corners (0,0)—left-most corner, (x2, 0)—a right corner, (0, y2)—an upper corner, and (x2, y2), which is the lowest left block, is the root. Block 2113 has the smallest x coordinate larger than x2 the right corner of the root block and a same y coordinate as a y coordinate of the right corner of the root block, and 2117 has the smallest y coordinate larger than y2 the upper corner of the root block, and a same x coordinate as a x coordinate of the upper corner of the root block. The block 2113 does not have any block to its right, therefore it has no left child. Block 2115 is the smallest among the y coordinate, therefore it is the right child of 2113. Finally, the block 2119 is the smallest to the right of 2115.

Figure 4:
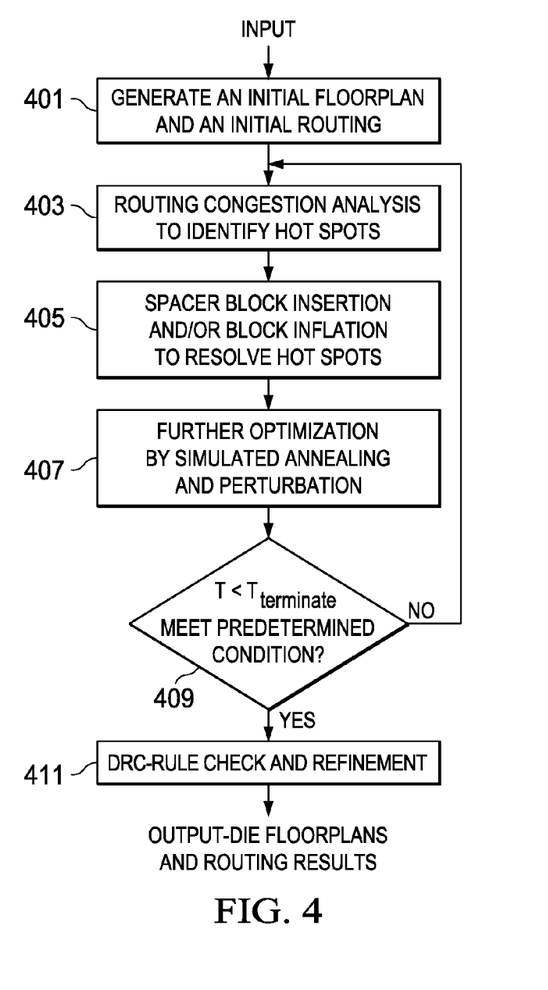
FIG. 4 illustrates an exemplary method of combined floorplanning and routing for multiple die.

FIG. 4 illustrates a method for floorplanning performed by a floorplanner. The input for the floorplanner may comprise area requirements such as blocks with well-defined shapes and area, and a netlist specifying block connections. A netlist may comprise all of the nets, or interconnections, among the cell pins of blocks. The input may comprise data about multiple die, instead of data for only one die. Other input parameters may comprise power requirements, timing constraints, physical partitioning information, die size, and performance tradeoff.

In step 401, the floorplanner may generate an initial floorplan with an initial routing on it. The initial floorplan may comprise locations for a plurality of blocks within a die, I/Os placed, macros placed, and power grid designed, and a net list that specifies the interconnections between the blocks. The blocks are placed within a layout area. The layout area may have a global coordinate system. The initial floorplan may further comprise placement of multiple die and the routing among the die in a layout area. A netlist may comprise all of the nets, or interconnections, among the cell pins of blocks, and the die. The initial floorplan may be similar to the one shown in FIG. 3(a), and represented by a FH tree 310 shown in FIG. 3(b). The initial floorplan may be randomly generated. Alternatively, the initial floorplan can be generated by other floorplanner software used in the art.

At step 403, the initial floorplan generated in step 401 goes through a routing congestion analysis within each die and among multiple die. The routing congestion analysis may be performed using any congestion models developed to estimate the congestion of a floorplan. For example, a netlist based stochastic model may be used for computing expected horizontal and vertical track usage, which considers routing blockages. Given a placed netlist, the layout area may be divided to form a homogeneous rectangular mesh. Congestion in each grid in the mesh may be analyzed based on the supply and demand for routing resources in the grid. The number of grids in the mesh can be either a fixed number or a variable that depends on the layout area and process technology parameters.

Figure 5A:
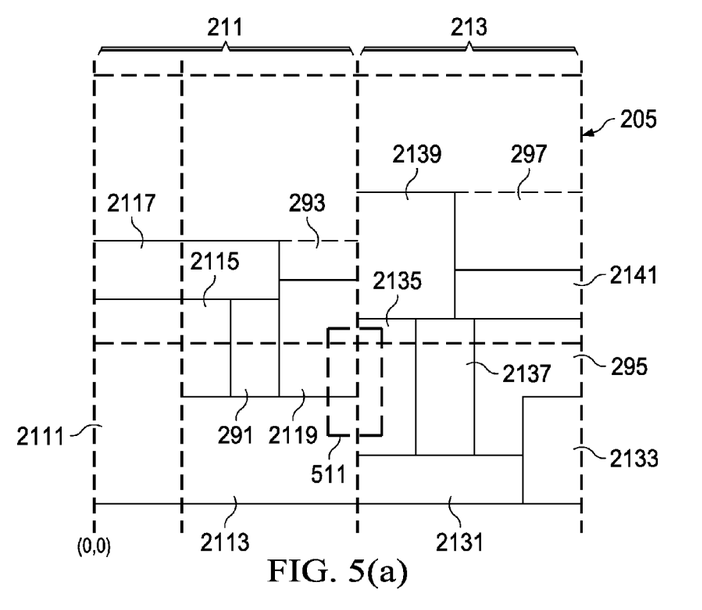
FIGS. 5(a)-5(d) illustrate an exemplary method for floorplanning to remove a hot spot among multiple dies.
Figure 6A:
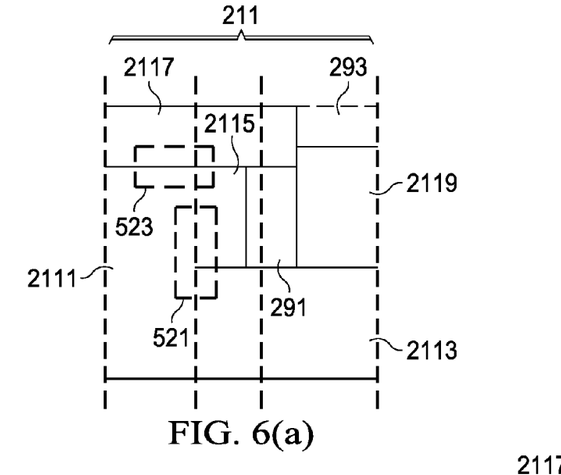
FIG. 6(a)-6(c) illustrate an exemplary method for floorplanning to remove hot spots among blocks of a die.

At step 403, during the routing congestion analysis, the hot spots for routing congestion may be identified. In general, a hot spot may be an area or a grid where wiring demand exceeds supply. The identification of hot spots is for allocating sufficient space for inter-die and intra die routing based on the initial routing feedbacks. The initial floorplan may comprise many hot spots. For example, as shown in FIG. 5(a), a hot spot 511 may be located between the connection of die 211 and die 213. As shown in FIG. 6(a), a hot spot 521 and a hot spot 523 may be located between blocks of a same die 211. The hot spots shown in FIGS. 5(a) and 6(a) are of a rectangle shape. Other hot spots may be of a circular shape or other irregular shape.

At step 405, the floorplanner may use a spacer block insertion technique to resolve hot spots between die shown in FIG.

Figure 5B:
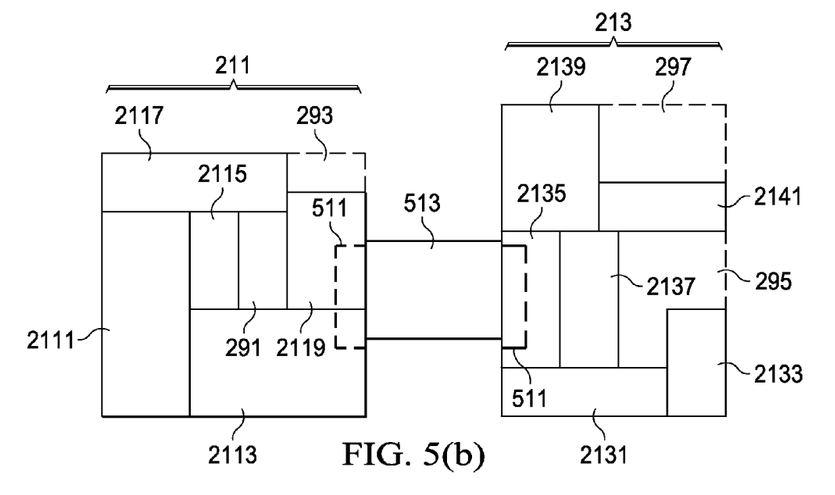
Figure 6B:
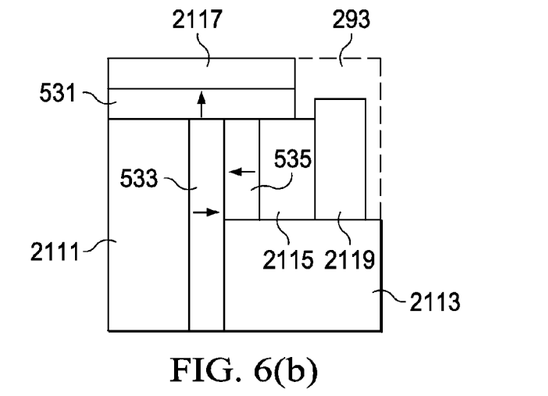
Figure 6C:
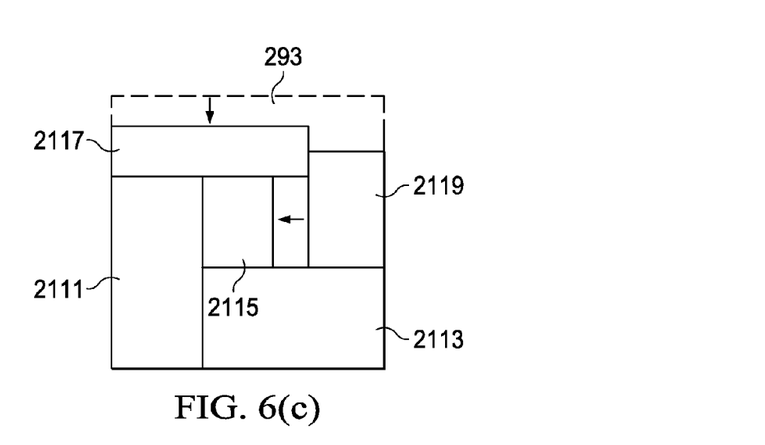

5(a), or a block inflation technique to resolve hot spots among blocks of a die shown in FIG. 6(a). More details are shown in FIG. 5(b) and FIG. 6(b)-6(c) respectively and described below.

As shown in FIG. 5(a), a hot spot 511 is identified between two die 211 and 213, where wiring demand exceeds supply. The hot spot is shown as a grid in rectangle shape. In some other embodiment, the hot spot may be of a circular shape or some other shape. As shown in FIG. 5(b), a spacer 513 is inserted between the two die 211 and 213, separating the hot spot 511 into two parts. The spacer block is a soft block and the size can be changeable. The spacer 513 shown has a smaller length than the hot spot 511. The spacer 513 may have larger length than the hot spot 511. The width of the spacer 513, which is the distance between die 211 and 213 after being separated, may vary as well. The length and the width of the spacer 513 may be large enough to resolve the hot spot 511 so that the connections between the die 211 and the spacer 513, and the connections between the spacer 513 and the die 213 have no hot spot.

Figure 5C:
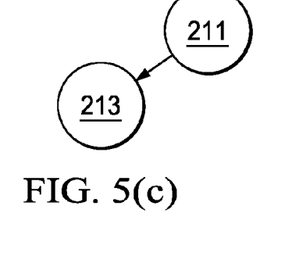
Figure 5D:
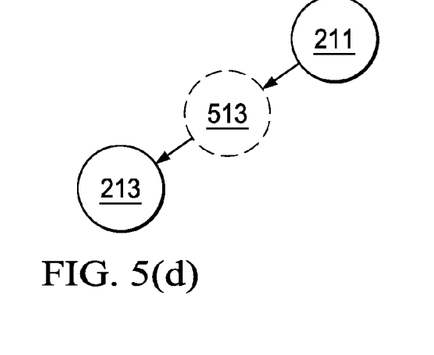

The insertion of spacer block may change the FH tree representing the floorplan. FIG. 5(c) and FIG. 5(d) show the floorplan representation before and after the spacer block insertion. As shown in FIG. 5(c), the FH tree representing the two die 211 and 213 has two nodes 211 and 213. After a spacer block 512 is inserted into the middle of the die 211 and 213, a new FH tree is obtained as shown in FIG. 5(d), where the tree has three nodes, 211, 213, and the new node 513 representing the spacer 513. The new node 513 is connected to the root 211 and to the child 213.

A hot spot may exist among multiple blocks within a die. As shown in FIG. 6(a), a hot spot 521 and a hot spot 523 are identified among blocks, where wiring demand exceeds supply. The hot spot is shown as a grid in rectangle shape. In some other embodiment, the hot spot may be of a circular shape or some other shape.

To resolve the hot spot between the block 2117 and 2115, the block 2117 may be inflated to increase a block dimension around the hotspot 523 to occupy more area. As shown in FIG. 6(b), an extra area 531 is added to the block 2117 and the original block 2117 is moved upwards in the y direction. Similarly, to resolve the hot spot 521 between the blocks 2115 and 2111, the block 2111 may be inflated, and the blocks 2113 and 2115 may be moved to the right to increase the block 2111 by a new space 533. At the meantime, the block 2115 may be inflated in the x direction as well, by inflating a new space 535.

FIG. 6(c) illustrates that a block can be shrunk to reduce space if the original congestion hot spot is resolved. As shown in FIG. 6(c), the block 2117 is moved down towards the blocks 2111 when the hot spot no longer exists. Similarly, the block 2115 may move to the left if the hot spot no longer exists.

The spacer block insertion technique introduces new floorplan blocks to resolve the hot spot, while the block inflation and shrinkage change the size of the blocks within a die. There are other techniques that will move the blocks around, called a perturbation of the blocks, to find a better placement which results in a better floorplan, which is the step 407 as illustrated in FIG. 4. The perturbation of blocks may be applied with simulated annealing technique to find which blocks to perturb. The perturbation may be performed in various ways in different data structures.

When a FH tree is used to represent the initial floorplan, at step 407, one FH tree is perturbed to another by the operations that move blocks or die around. A FH tree may be perturbed to get another FH tree by the following operations: (1) switch a first node in the FH tree with a second node in the FH tree; (2) swap two block nodes within a subtree represented by a node in the FH tree; (3) swap two sub-trees of the FH tree. The optimized placement may be found by performing simulated annealing operation through repeated perturbations of the blocks and dies. When the initial floorplan is represented by a data structure other than a FH tree, similar kinds of block movement may be defined as well.

As illustrated in FIG. 4, after each optimization of simulated annealing and perturbation at step 407, an analysis is performed to evaluate the placement and hot spots, and decide whether to accept the new solution. At step 409, the result of the step 407 is tested to see whether the terminating temperature T_terminate for the simulated annealing is met or not for the simulated annealing. Alternatively, a predetermined performance condition is tested to see whether the predetermined performance condition is met or not. The predetermined performance condition may be the number of hot spots. It could be some other performance metrics such as power or timing constraints. If the predetermined performance constraint is met or the terminating temperature T_terminate for the simulated annealing is met, then the floorplanner may check whether design rules are met at step 411, and to see whether any other refinement is needed. Finally the floorplanner will output the die floorplan with routing results.

At the step 409 test, if the result of the step 407 does not meet the predetermined performance constraint or the terminating temperature T_terminate, then the result of the floorplan is passed to the routing congestion analysis step 403 again to identify the hot spots, and change the blocks and dies with spacer block insertion and block inflation at step 405 again. Afterwards, an optimization by simulated annealing and perturbation may be performed similarly as it has been done before at step 407. The result of step 407 is tested again at step 409.

FIGS. 7(a)-7(e) illustrates more details on how the floorplanning result produced by a tool employing a method illustrated in FIG. 4 is used in multiple die placement and interposer routing among multiple die.

Figure 7A:
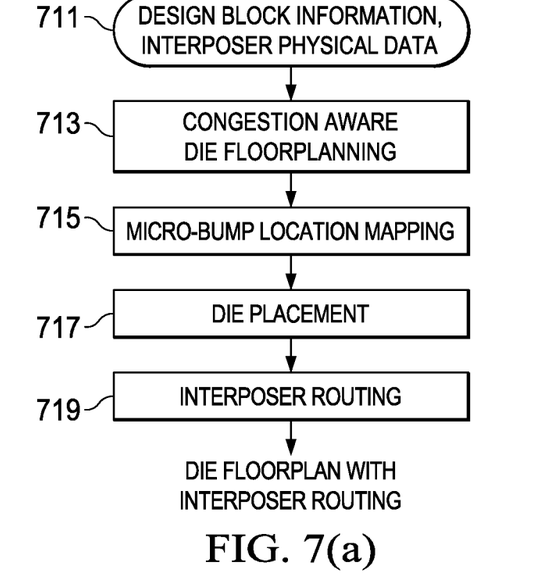
FIGS. 7(a)-7(e) illustrate an exemplary method of combined floorplanning and routing for multiple die on an interposer within a package.

Starting from step 711, the design block information, the interposer physical data, may be provided as an input. The input may further comprise area requirements such as blocks with well-defined shapes and area, and a netlist specifying block connections. The input may comprise data about multiple die. Other input parameters may comprise power requirements, timing constraints, physical partitioning information, die size, and performance tradeoff.

In step 713, the input data may be supplied to a floorplanner which may generate the floorplan for multiple die as illustrated in FIG. 4, which has been described in details above. The floorplan of the die may be congestion aware because the method illustrated in FIG. 4 uses a routing congestion analysis to identify routing hot sports and to remove such hot spots using the spacer block insertion technique or the block inflation technique.

Figure 7B:
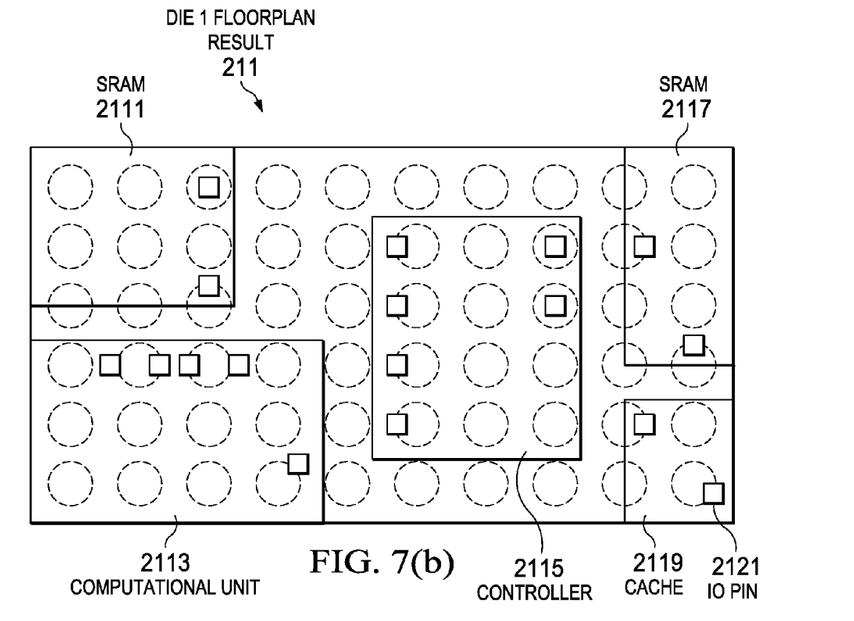
Figure 7C:
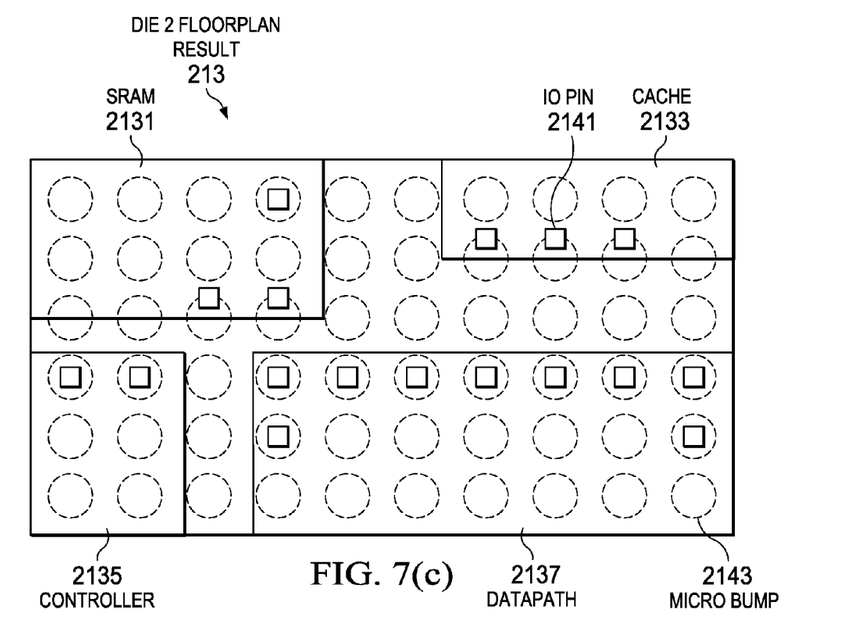
Figure 7D:
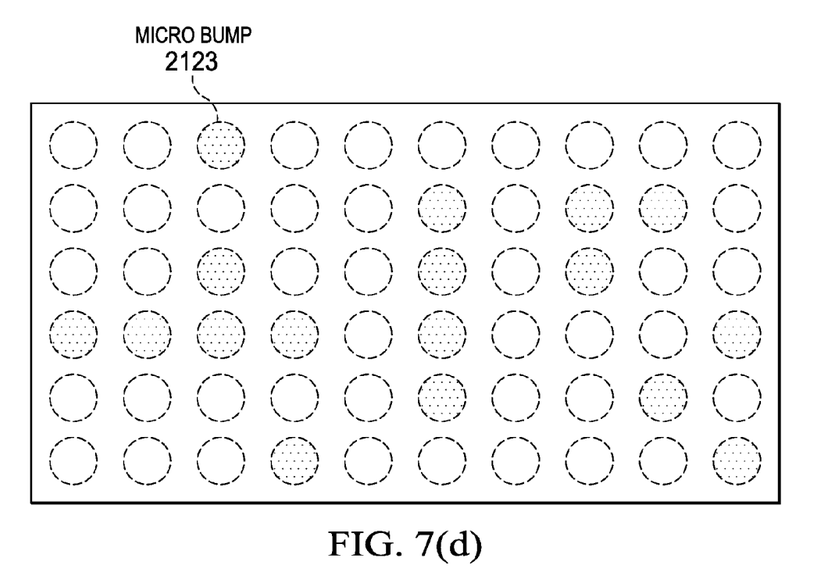
Figure 7E:
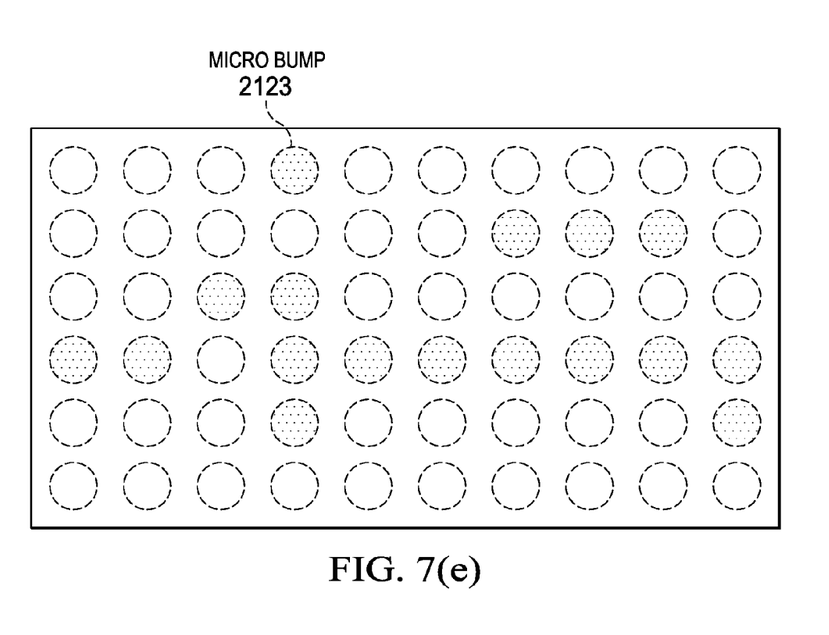

In step 715, micro-bump location mapping is performed. The details of micro-bump mapping may be shown in FIG. 7(b)-7(e). FIGS. 7(b) and 7(c) are two die as shown in FIGS. 2(b) and 2(c). FIGS. 7(d) and 7(e) show more details of the mapping of the IO pin 2121 and 2141 of function blocks of the die 211 and 213 to micro-bumps 2123 and 2143. Micro-bumps 2123 and 2143 are connected to each other according to block connections 211 and 213. The micro-bumps shown in FIGS. 7(d) and 7(e) may be similar to the micro-bumps 203 shown in FIG. 2(a).

In step 717, the die may be placed on the interposer, which may be similar to the example shown in FIG. 2(a). In step 719, interposer routing may be performed. The interposer routing may be done through the micro-bumps 203 and the interposer routing layer 2019 as shown in FIG. 2(a).

Figure 8:
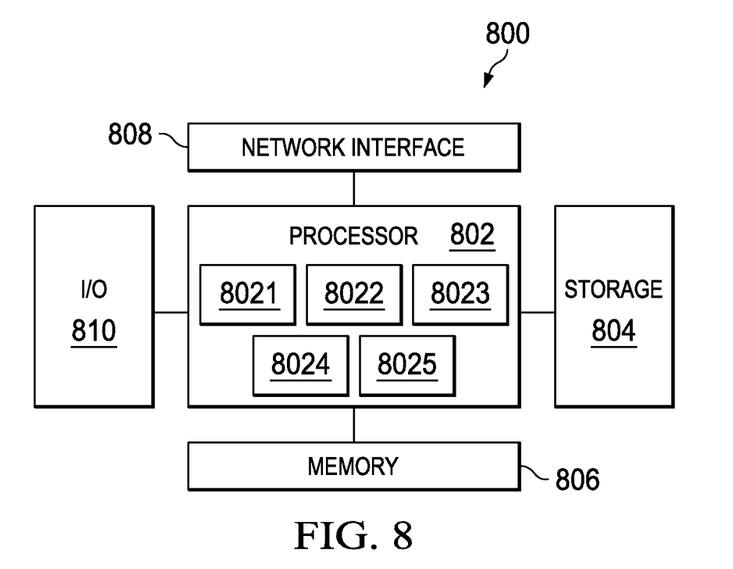
FIG. 8 illustrates an exemplary implementation of a method of combined floorplanning and routing for multiple die within a package.

The methods described herein can be implemented in software stored on a computer-readable medium and executed on a computer. Some of the disclosed methods, for example, can be implemented as part of an EDA or CAD tool. Such methods can be executed on a single computer or a networked computer. FIG. 8 illustrates such a computer system for implementing the methods.

The unit 800 may contain a processor 802 that controls the overall operation of the controller 800 by executing computer program instructions which define such operation. Processor 802 may include one or more central processing units, read only memory (ROM) devices and/or random access memory (RAM) devices. The processor 802 may be an ASIC, a general purpose processor, a Digital Signal Processor, a combination of processors, a processor with dedicated circuitry, dedicated circuitry functioning as a processor, and a combination thereof.

The computer program instructions may be stored in a storage device 804 (e.g., magnetic disk, database, etc.) and loaded into memory 806 when execution of the computer program instructions is desired. Thus, applications for performing the herein-described method steps can be defined by the computer program instructions stored in the memory 806 or storage 804 and controlled by the processor 802 executing the computer program instructions.

In alternative embodiments, hard-wired circuitry or integrated circuits may be used in place of, or in combination with, software instructions for implementation of the processes of the present invention. Thus, embodiments of the present invention are not limited to any specific combination of hardware, firmware, or software. The memory 806 may store the software for the controller 800, which may be adapted to execute the software program and thereby operate in accordance with the present invention and particularly in accordance with the methods described in detail above. However, the invention as described herein could be implemented in many different ways using a wide range of programming techniques as well as general purpose hardware sub-systems or dedicated controllers.

The unit 800 may also include one or more network interfaces 808 for communicating with other devices via a network. In wireless portions of the network, the network interface could include an antenna and associated processing. In wired portions of the network, the network interface could include connections to the cables that connect the unit to other units. In either case, the network interface could be thought of as circuitry for accessing the physical communications portions (such as the antenna).

The unit 800 could also include input/output devices 810 (e.g., display, keyboard, mouse, speakers, buttons, etc.) that enable user interaction with the controller 800. These user I/O devices are optional and not needed if the unit 800 is accessed by the network interfaces only.

The processor 802 may implement a receiver 8021 receiving data from the I/O unit 810 or the network interface 808. The receiver receives an input representing a plurality of die on a layout area on an interposer, wherein each die among the plurality of dies comprises a plurality of blocks, and connections for the plurality of blocks within each die and connections for the plurality of dies are specified by a netlist. The processor 802 may comprise a floorplanning unit 8022 to perform congestion aware die floorplanning at the layout area for the plurality of die based on the netlist. The congestion aware die floorplanning may be performed using a stochastic model based on the netlist, to identify a first hot spot between a first die and a second die, and to insert a spacer block at the first hot spot between the first die and the second die. The floorplanning unit 8022 may perform a congestion aware die floorplanning to identify a second hot spot between a first block and a second block within a die, and to inflate the first block at the second hot spot within the die. The processor 802 may comprise a mapping unit 8023 to map a plurality of micro bumps to a plurality of pins of blocks of the plurality of die based on the netlist. The processor 802 may comprise a placement unit 8024 to place the plurality of die on the layout area. The processor 802 may comprise a routing unit 8025 to rout a plurality of metal connections for the plurality of blocks within each die and connections for the plurality of dies.

An implementation of unit 800 could contain other components as well, and that the controller of FIG. 8 is a high level representation of some of the components of such a controller for illustrative purposes.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method for floorplanning, comprising:
providing an input file in an electronic format in a computer readable medium, wherein the input file comprises a first floorplan for a plurality of dies on a layout area, wherein each die among the plurality of dies comprises a plurality of blocks, and connections for the plurality of blocks within each die and connections for the plurality of dies are specified by a netlist;
using a processor executing instructions that are stored on a computer memory device connected to the processor, performing a routing congestion analysis for the first floorplan based on the netlist to identify a first hot spot between a first die and a second die;
using a processor executing instructions that are stored on a computer memory device connected to the processor, inserting a spacer block at the first hot spot between the first die and the second die to result in a second floorplan;
generating a photomask pattern based on the second floorplan; and
manufacturing a photomask based upon the photomask pattern.

2. The method of claim 1, further comprising the following steps, at least one of which is performed using a processor executing instructions that are stored on a computer memory device connected to the processor,:

performing a routing congestion analysis for a die among the plurality of dies to identify a second hot spot between a first block and a second block within the die; and inflating the first block at the second hot spot to result in a third floorplan for the die.

3. The method of claim 2, wherein the first block is inflated at a x direction or a y direction.

4. The method of claim 1, further comprising the following steps, at least one of which is performed using a processor executing instructions that are stored on a computer memory device connected to the processor,:

perturbing a third die and a fourth die among the plurality of dies, or perturbing a third block and a fourth block within a die, to result in a third floorplan;

checking the third floorplan for a predetermined terminating condition; and performing a design rule check on the third floorplan when the predetermined terminating condition is satisfied by the third floorplan.

5. The method of claim 1, further comprising the following steps, at least one of which is performed using a processor executing instructions that are stored on a computer memory device connected to the processor,:

perturbing a third die and a fourth die among the plurality of dies, or perturbing a third block and a fourth block within a die, to result in a third floorplan;

checking the third floorplan for a predetermined terminating condition;

performing a routing congestion analysis for the third floorplan based on the netlist when the predetermined terminating condition is not satisfied; and identifying a third hot spot between a fifth block and a sixth block within a die, and inflating the fifth block at the third hot spot.

6. The method of claim 1, further comprising the following steps, at least one of which is performed using a processor executing instructions that are stored on a computer memory device connected to the processor,:

perturbing a third die and a fourth die among the plurality of dies, or perturbing a third block and a fourth block within a die, to result in a third floorplan;

checking the third floorplan for a predetermined terminating conditions;

performing a routing congestion analysis for the third floorplan based on the netlist when the predetermined terminating condition is not satisfied;

identifying a fourth hot spot between a fifth block and a sixth block within a die, and inflating the fifth block at the fourth hot spot; and identifying a fifth hot spot between a fifth die and a sixth die, and inserting a spacer block at the fifth hot spot between the fifth die and the sixth die.

7. The method of claim 1, wherein the plurality of blocks of each die is selected from a group consisting essentially of a hard macro, a soft macro, or a standard cell.

8. The method of claim 1, wherein the plurality of blocks of each die is of a shape selected from a group consisting essentially of a rectangle, an L-shape, or a T-shape.

9. The method of claim 1, wherein the layout area comprises a plurality of layout grid of different sizes.

10. The method of claim 1, wherein the routing congestion analysis is performed using a stochastic model based on the netlist.

11. The method of claim 1, wherein the first hot spot is of a shape of rectangle or a circle.

12. The method of claim 1, wherein the first floorplan for the plurality of die is represented by a flexible hierarchical (FH) tree, wherein a node of the FH tree represents a die of the plurality of dies, and the node itself is a tree representing a plurality of blocks within the die represented by the node.

13. The method of claim 12, wherein the FH tree has a root node representing a left-most die in a left-most position among the plurality of dies, a left child of the root node representing a left child die whose left-most corner has a smallest x coordinate that is bigger than a x coordinate of a right corner of the left-most die and a same y coordinate as a y coordinate of the right corner of the left-most die, a right child of the root node representing a right child die whose left-most corner has a smallest y coordinate that is bigger than a y coordinate of an upper corner of the left-most die and a same x coordinate as a x coordinate of the upper corner of the left-most die.

14. The method of claim 12, wherein the tree of the node has a root node representing a left-most block in a left-most position among the plurality of blocks within the die, a left child of the root node representing a left child block whose left-most corner has a smallest x coordinate that is bigger than a x coordinate of a right corner of the left-most block and a same y coordinate as a y coordinate of the right corner of the left-most block, a right child of the root node representing a right child block whose left-most corner has a smallest y coordinate that is bigger than a y coordinate of an upper corner of the left-most block and a same x coordinate as a x coordinate of the upper corner of the left-most block.

15. The method of claim 12, wherein inserting the spacer block at the first hot spot between the first die and the second die changes the FH tree representing the plurality of dies by adding a node representing the spacer block between a node representing the first die and a node representing the second die.

16. The method of claim 1, wherein the plurality of dies is placed on an interposer and connected by an interposer routing layer and a plurality of micro bumps.

17. A method of floorplanning a plurality of dies on an interposer, comprising:

providing an input file in an electronic format in a computer readable medium, wherein the input file comprises a floorplan for a plurality of dies on a layout area on an interposer, wherein each die among the plurality of dies comprises a plurality of blocks, and connections for the plurality of blocks within each die and connections for the plurality of dies are specified by a netlist;

using a processor executing instructions that are stored on a computer memory device connected to the processor, performing a congestion aware die floorplanning at the layout area for the plurality of dies based on the netlist, wherein the congestion aware die floorplanning includes a step of inserting a spacer block between a first die and a second die of the plurality of dies in response to identifying a hot spot between the first die and the second die of the plurality of dies, or the step of inflating a first block of the plurality of blocks in response to identifying a hot spot between the first block and a second block of the plurality of blocks;

using the processor executing instructions that are stored on the computer memory device connected to the processor, mapping a plurality of micro bumps to a plurality of pins of blocks of the plurality of dies based on the netlist;

using the processor executing instructions that are stored on the computer memory device connected to the processor, placing the plurality of dies on the layout area; and using the processor executing instructions that are stored on the computer memory device connected to the processor, routing a plurality of metal connections for the plurality of blocks within each die and connections for the plurality of dies.

18. The method of claim 17, wherein the congestion aware die floorplanning is performed using a stochastic model based on the netlist, to identify a first hot spot between a first die and a second die, and to insert a spacer block at the first hot spot between the first die and the second die.

19. The method of claim 18, wherein the congestion aware die floorplanning is further performed using a stochastic model based on the netlist, to identify a second hot spot between a first block and a second block within a die, and to inflate the first block at the second hot spot within the die.

20. A system for floorplanning a plurality of dies on an interposer, comprising:

a receiver to receive an input representing a plurality of dies on a layout area on an interposer, wherein each die among the plurality of dies comprises a plurality of blocks, and connections for the plurality of blocks within each die and connections for the plurality of dies are specified by a netlist; and a floorplanning unit to perform a congestion aware die floorplanning at the layout area for the plurality of dies based on the netlist, using a stochastic model based on the netlist, to identify a first hot spot between a first die and a second die, and to insert a spacer block at the first hot spot between the first die and the second die, and to identify a second hot spot between a first block and a second block within a die, and to inflate the first block at the second hot spot within the die;

a mapping unit to map a plurality of micro bumps to a plurality of pins of blocks of the plurality of dies based on the netlist;

a placement unit to place the plurality of dies on the layout area;

a routing unit to rout a plurality of metal connections for the plurality of blocks within each die and connections for the plurality of dies; and a display device configured to display in human perceivable format a result from at least one of the floorplanning unit, the mapping unit, the placement unit, and the routing unit.

* * * * *